United States Patent
Wang et al.

(10) Patent No.: US 8,129,968 B2
(45) Date of Patent: Mar. 6, 2012

(54) INTEGRATED CIRCUIT FOR SYSTEM CALIBRATION

(75) Inventors: Yen-Hui Wang, Hsin-Chu (TW);
Wei-Chun Hsiao, Hsin-Chu (TW)

(73) Assignee: Grenergy Opto, Inc., Hsin-Chu (TW)

( * ) Notice: Subject to any disclaimer, the term of this patent is extended or adjusted under 35 U.S.C. 154(b) by 261 days.

(21) Appl. No.: 12/707,359

(22) Filed: Feb. 17, 2010

(65) Prior Publication Data

US 2011/0133705 A1 Jun. 9, 2011

(30) Foreign Application Priority Data

Dec. 4, 2009 (TW) ................................ 98222734 U

(51) Int. Cl.
*G05F 1/40* (2006.01)
(52) U.S. Cl. ......................... 323/280; 323/275; 323/281
(58) Field of Classification Search .................. 323/234, 323/274, 275, 280, 281
See application file for complete search history.

(56) References Cited

U.S. PATENT DOCUMENTS

| | | | | |
|---|---|---|---|---|
| 6,750,639 B2 * | 6/2004 | Harrison | ....................... | 323/281 |
| 7,830,129 B2 * | 11/2010 | Tseng | ........................... | 323/281 |
| 7,983,062 B2 * | 7/2011 | Wang et al. | ................ | 363/56.01 |
| 8,068,354 B2 * | 11/2011 | Wang et al. | ................ | 363/21.09 |
| 2008/0315943 A1 * | 12/2008 | Underhill | ....................... | 327/552 |
| 2009/0243571 A1 * | 10/2009 | Cook et al. | ..................... | 323/280 |

* cited by examiner

*Primary Examiner* — Jessica Han
(74) *Attorney, Agent, or Firm* — Muncy, Geissler, Olds & Lowe, PLLC

(57) ABSTRACT

The present invention discloses an integrated circuit for system calibration, applicable to a power supply, comprising: a comparison module, having a feedback input end coupled to a feedback signal and a reference input end coupled to an analog reference signal for delivering a status signal; a detection and control module, for generating a reference signal and a calibration value according to the status signal, wherein the calibration value is derived from the reference signal at an instant when the status signal changes state, and the calibration value is stored into a calibration value register; a memory module, for receiving, storing and outputting the calibration value; and a reference signal generator, receiving the calibration value to provide the analog reference signal. The present invention can therefore be used to automatically calibrate a system with fewer external components to provide qualified systems.

5 Claims, 2 Drawing Sheets

INTEGRATED CIRCUIT FOR SYSTEM CALIBRATION

BACKGROUND OF THE INVENTION

1. Field of the Invention

The present invention relates to a programmable integrated circuit, especially to an integrated circuit which can be used to automatically calibrate a system according to a required specification with fewer external components.

2. Description of the Related Art

Thanks to the innovative development of electronic technology, a variety of electronic products such as computer systems, mobile communication devices, household appliances, etc., have become integral parts of our daily life. The operation of an electronic product requires stable power source, which is usually provided by a power supply installed inside the electronic product.

To offer stable power, the circuit system of the power supply has to be well designed. However, there is a disadvantage in manufacturing the circuit system of the power supply—the variances of the component values can cause the power supply fail to meet a more precise specification. Therefore, there is a need of an automatic calibration mechanism, which can be used to compensate the system performance error caused by the variances of the component values and thereby provide qualified systems.

The solution of the problem mentioned above is what the inventors of the present invention and the related vendors of this field are striving for.

SUMMARY OF THE INVENTION

In view of the problem mentioned above, the inventors of the present invention, gone through data collection, brain storming, resorting to years of experience in this field and times of experiment, finally propose an integrated circuit for system calibration which can be used to automatically calibrate a system with fewer external components to turn disqualified systems into qualified ones.

The major objective of the present invention is to provide an integrated circuit for system calibration which can be used to automatically calibrate a system with fewer external components to turn disqualified systems into qualified ones.

To achieve the foregoing objective, the present invention provides an integrated circuit for system calibration, applicable to a power supply, comprising: a comparison module, having a feedback input end and a reference input end, wherein the feedback input end is coupled to a feedback signal, the reference input end is coupled to an analog reference signal, and a status signal is output from the comparison module according to the comparison of the feedback signal with the analog reference signal; a detection and control module, for receiving the status signal, outputting a time-varying reference signal and generating a calibration value, wherein the calibration value is derived from the time-varying reference signal at an instant when the status signal changes state, and the calibration value is stored into a calibration value register; a memory module, coupled to the detection and control module for receiving, storing and outputting the calibration value to the reference input end.

As the variances of the component values can cause the circuit systems fail to meet a more precise specification, therefore, there is a need of an automatic calibration mechanism to compensate the variances effect. The present invention utilizes the comparison module having a feedback input end and a reference input end, the feedback input end being coupled to a feedback signal derived from a signal of the circuit system, which is to be calibrated, the reference input end being coupled to an analog reference signal, and a status signal being output from the detection and control module according to the comparison of the feedback signal with the analog reference signal. When the status signal changes state at an instant, the detection and control module will stop outputting a time-varying reference signal and record the value of the time-varying reference signal at that instant as a calibration value to be output. The calibration value is written into the memory module and then delivered to a reference signal generator for providing the analog reference signal. Via the proposed mechanism, the present invention can automatically detect and compensate the system error with fewer external components to result qualified systems meeting the required specification. The present invention can therefore promote the yield rate and reliability, and reduce the cost of manufacture time and man power.

To make it easier for our examiner to understand the objective of the invention, its structure, innovative features, and performance, we use a preferred embodiment together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 1:
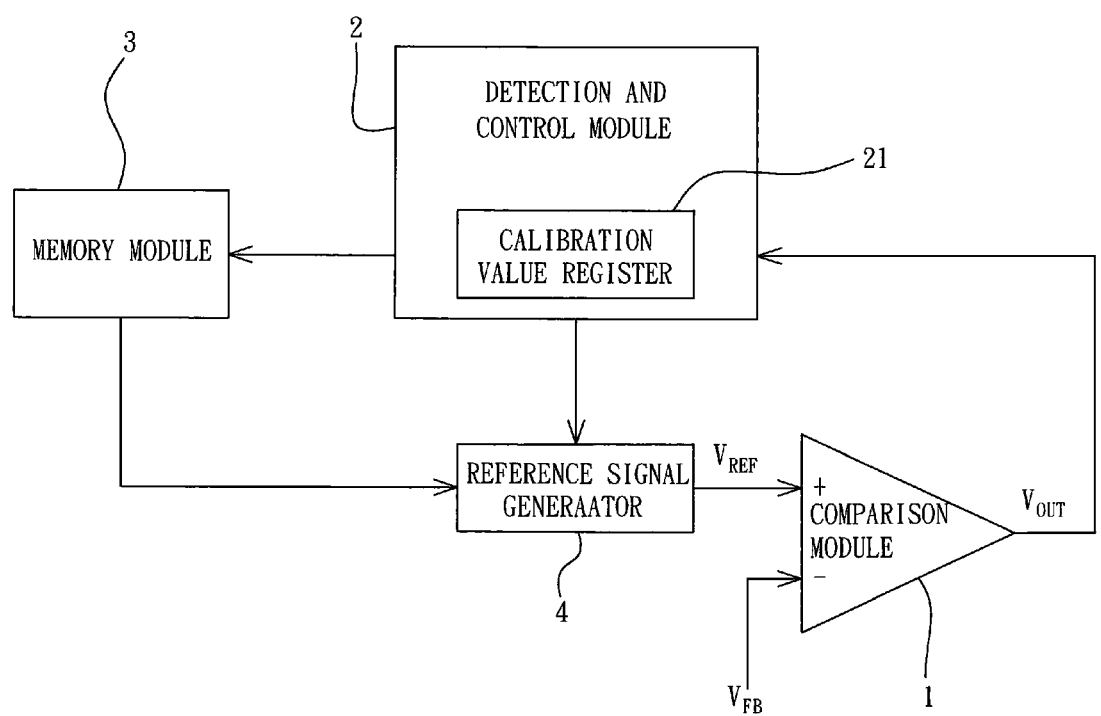
FIG. 1 is a block diagram according to a preferred embodiment of the present invention.

Please refer to FIG. 1, which shows a block diagram according to a preferred embodiment of the present invention. As shown in the figure, the preferred embodiment comprises:

a comparison module 1, having a feedback input end − and a reference input end +, wherein the feedback input end − is coupled to a feedback signal $V_{FB}$, the reference input end + is coupled to an analog reference signal $V_{REF}$, which can be, for example but not limited to, of a stair-wise waveform (ex.: 1.21V, 1.22V, 1.23V . . . ), and a status signal $V_{OUT}$ is output from the comparison module 1 according to the comparison of the feedback signal $V_{FB}$ with the analog reference signal $V_{REF}$, and the comparison module 1 can comprises an amplifier or a comparator;

a detection and control module 2—for example but not limited to a digital processing control circuit—for generating a time-varying reference signal and a calibration value according to the status signal $V_{OUT}$, wherein the calibration value is derived from the time-varying reference signal at an instant when the status signal $V_{OUT}$ changes state, and the calibration value is stored into a calibration value register 21;

a memory module 3, for receiving and storing the calibration value, and then outputting the calibration value to the reference signal generator 4, wherein the memory module 3 can comprise a one-time programming integrated circuit or a storage device; and a reference signal generator 4—for example but not limited to a digital-to-analog conversion circuit—receiving the calibration value from the memory module 3 and receiving the time-varying reference signal from the detection and control module 2 to provide the analog reference signal $V_{REF}$, wherein the detection and control module 2 can control the reference signal generator 4 directly or via the memory module 3.

Figure 2:
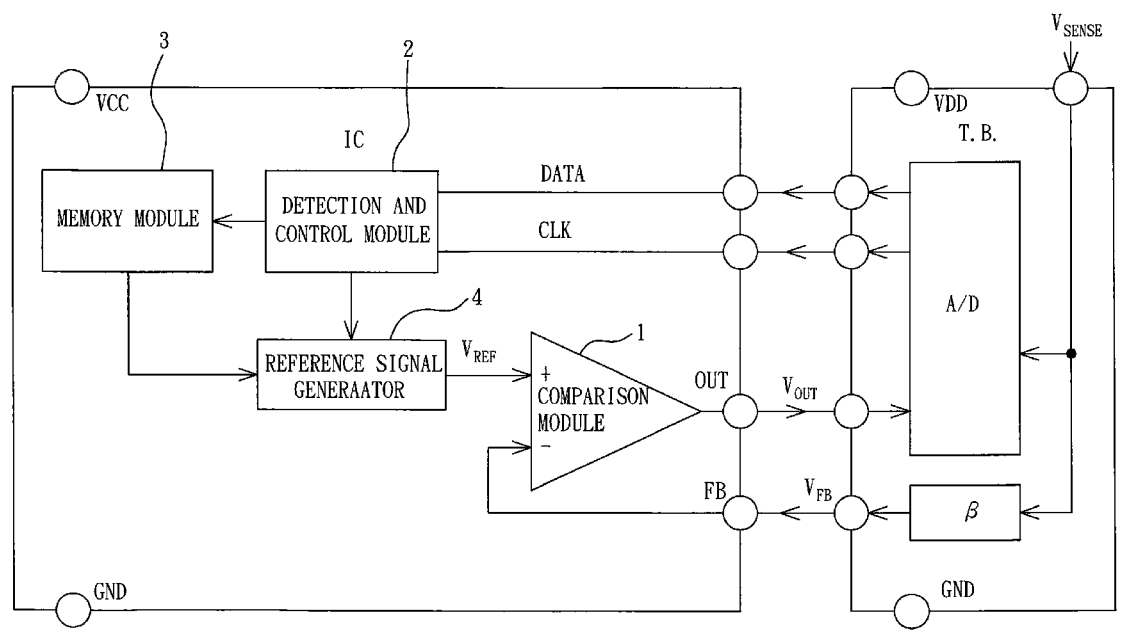
FIG. 2 is a block diagram illustrating the application of a preferred embodiment of the present invention.

The design in FIG. 1 can be applied to calibrate a power supply. Please refer to FIG. 2, which shows a block diagram illustrating the application of FIG. 1. As the variances of the component values can cause the circuit systems (e.g.: power supply circuit systems) fail to meet a more precise specification, therefore, there is a need of an automatic calibration mechanism to compensate the variances effect. The present invention utilizes the comparison module 1 having a feedback input end − and a reference input end +, the feedback input end − being coupled to a feedback signal $V_{FB}$ derived from a signal $V_{SENSE}$ of the circuit system, which is to be calibrated, the reference input end + being coupled to an analog reference signal $V_{REF}$, which can be, for example but not limited to, of an increasing or decreasing stair-wise waveform (ex.: 1.21V, 1.22V, 1.23V . . . or 1.23V, 1.22V, 1.21V . . . ), and a status signal $V_{OUT}$ being delivered to the detection and control module 2 according to the comparison of the feedback signal $V_{FB}$ with the analog reference signal $V_{REF}$. When the status signal $V_{OUT}$ changes state—for example but not limited to from a low level to a high level—at an instant, the detection and control module 2 will stop outputting a time-varying reference signal and record the value of the time-varying reference signal at that instant as a calibration value to be output. The calibration value, used for the system to compensate the variances effect, is written into the memory module 3 and then delivered to the reference signal generator 4 for providing the analog reference signal $V_{REF}$. Via the proposed mechanism, the present invention can automatically detect and compensate the system error with fewer external components to result qualified systems meeting the required specification. The present invention therefore can promote the yield rate and reliability, and reduce the cost due to manufacture time and man power.

Besides, as the present invention utilizes the one-time programming integrated circuit, when applied to different circuits, the calibration values written into the one-time programming integrated circuits are likely different, so that others can not easily copy the circuit of the present invention.

Therefore, compared to prior art, the present invention possesses the advantages of:

When the status signal $V_{OUT}$ changes state at an instant, the detection and control module 2 will stop outputting a time-varying reference signal and record the value of the time-varying reference signal at that instant as a calibration value to be output. The calibration value, used for the system to compensate the variances effect, is written into the memory module 3 and then delivered to the reference signal generator 4 for providing the analog reference signal $V_{REF}$. Via the proposed mechanism, the present invention can automatically detect and compensate the system error with fewer external components to result qualified systems meeting the required specification.

While the invention has been described by way of examples and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. An integrated circuit for system calibration, applicable to a power supply, comprising:
    a comparison module, having a feedback input end and a reference input end, wherein said feedback input end is coupled to a feedback signal, said reference input end is coupled to an analog reference signal, and a status signal is output from said comparison module according to the comparison of said feedback signal with said analog reference signal;
    a detection and control module, for generating a time-varying reference signal and a calibration value according to said status signal, wherein said calibration value is derived from said time-varying reference signal at an instant when said status signal changes state, and said calibration value is stored into a calibration value register;
    a memory module, coupled to said detection and control module for receiving, storing and outputting said calibration value; and
    a reference signal generator, receiving said calibration value from said memory module and receiving said time-varying reference signal from said detection and control module to provide said analog reference signal, wherein said detection and control module can control said reference signal generator directly or via said memory module.

2. The integrated circuit for system calibration as claim 1, wherein said memory module comprises a one-time programming integrated circuit or a storage device.

3. The integrated circuit for system calibration as claim 1, wherein said comparison module comprises an amplifier or a comparator.

4. The integrated circuit for system calibration as claim 1, wherein said detection and control module comprises a digital processing control circuit.

5. The integrated circuit for system calibration as claim 1, wherein said reference signal generator comprises a digital-to-analog conversion circuit.

* * * * *